US006934594B2

United States Patent
Loring et al.

(10) Patent No.: US 6,934,594 B2
(45) Date of Patent: Aug. 23, 2005

(54) SYSTEM FOR DETERMINING CARRIER SERVICE USING LOGISTICS CONSIDERATIONS

(75) Inventors: Steven Clay Loring, Hermitage, TN (US); Wayne Leroy Zorn, Austin, TX (US); Allison Fay Searcy, Austin, TX (US); Ihab Al-Wazani, Round Rock, TX (US); Jeffrey David Joyce, Round Rock, TX (US); William Frederick Reeves, Austin, TX (US); Michael R. Rogers, Georgetown, TX (US); Christopher Waters, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 10/623,256

(22) Filed: Jul. 18, 2003

(65) Prior Publication Data

US 2005/0015164 A1 Jan. 20, 2005

(51) Int. Cl.[7] .............................................. G06F 19/00

(52) U.S. Cl. ........................... 700/100; 700/216; 705/8

(58) Field of Search ...................... 700/97, 100, 216; 705/7, 8, 28

(56) References Cited

U.S. PATENT DOCUMENTS

| | | | |
|---|---|---|---|
| 4,646,238 A | 2/1987 | Carlson, Jr. et al. | 364/403 |
| 4,887,207 A | 12/1989 | Natarajan | 364/401 |
| 5,068,797 A | 11/1991 | Sansone et al. | 364/478 |
| 5,072,401 A | 12/1991 | Sansone et al. | 364/478 |
| 5,101,352 A | 3/1992 | Rembert | 364/401 |
| 5,193,065 A | 3/1993 | Guerindon et al. | 364/468 |
| 5,216,593 A | 6/1993 | Dietrich et al. | 364/402 |
| 5,450,317 A * | 9/1995 | Lu et al. | 705/10 |
| 6,029,140 A * | 2/2000 | Martin et al. | 705/11 |
| 6,701,299 B2 * | 3/2004 | Kraisser et al. | 705/8 |
| 2002/0019759 A1 * | 2/2002 | Arunapuram et al. | 705/7 |
| 2004/0054570 A1 * | 3/2004 | Streetman | 705/8 |

* cited by examiner

Primary Examiner—Kidest Bahta
(74) Attorney, Agent, or Firm—Hamilton & Terrile, LLP; Stephen A. Terrile

(57) ABSTRACT

A method for scheduling the manufacture of an item, in a factory which includes planning a time for manufacturing an item so as to have the manufacture of the item complete during a desired shipping window, determining the desired shipping window so as to allow the item to be shipped via a lower cost shipping method while arriving at a destination as if shipped via an expedited shipping method, and determining a carrier service for shipping the item so as to enable the item to be shipped via a lower cost shipping method while arriving at a destination as if shipped via an expedited shipping method is disclosed.

51 Claims, 12 Drawing Sheets

| Hubs | Ground Cut | Carrier Sort | Travel Time |
|---|---|---|---|
| Atlanta | 10:30 a.m. | 5:00 p.m. | 6.5 hours |
| Chicago | 2:00 a.m. | 11:00 a.m. | 9 hours |
| Logistics Hub C | 6:30 a.m. | 5:00 p.m. | 10.5 hours |
| Logistics Hub D | 1:30 a.m. | 5:00 p.m. | 15.5 hours |
| Logistics Hub E | 11:30 p.m. | 11:00 a.m. | 11.5 hours |
| Meadowlands | No TOD | 11:00 a.m. | Not Applicable |
| Logistics Hub G | 3:30 a.m. | 5:00 p.m. | 13.5 hours |
| Logistics Hub H | 2:00 a.m. | 5:00 p.m. | 15 hours |
| Logistics Hub I | 4:30 a.m. | 9:30 p.m. | 17 hours |
| Logistics Hub J | No TOD | 10:00 p.m. | Not Applicable |
| Logistics Hub K | 12:00 a.m. | 11:00 a.m. | 11 hours |
| Whitescreek | All TOD | 7:00 p.m. | Not Applicable |

*Figure 7*

(Midnight - 2:00 AM)

(5:00 AM - 7:00 AM)

(6:00 PM - Midnight)

(2:00 AM - 5:00 AM)

SYSTEM FOR DETERMINING CARRIER SERVICE USING LOGISTICS CONSIDERATIONS

BACKGROUND OF THE INVENTION

1. Field of the Invention

The present invention relates to manufacturing order scheduling and more particularly to synchronizing production and routing of orders.

2. Description of the Related Art

Scheduling work in a manufacturing environment is a complex process. Most factories use an automated planning and scheduling system to ensure that customer demand is satisfied in a timely manner with minimum inventory. To achieve this goal, such planning requires that work for each manufacturing line is efficiently scheduled, that the appropriate materials needed to complete each task performed are available when needed on the manufacturing line, and that products are manufactured in the order that the products are needed. To produce a manufacturing schedule, customer orders should be received and analyzed, priorities should be assigned to items to be manufactured, manufacturing resources should be allocated, work should be scheduled, raw materials and/or parts should be obtained and delivered to the manufacturing line, work in progress should be tracked, and variability in availability of raw materials and/or parts must be handled. Many manufacturing facilities plan and manage these many tasks by combining multiple computerized planning and scheduling systems with paper-based management systems.

An example of a widely-used commercially available automated planning and scheduling system is 32 Technologies, Inc.'s Factory Planner and Demand Fulfillment and Supply Chain Planner. The 32 Factory Planner generates work schedules and material requirements schedules using customer-provided inputs of demand and inventory. The 32 Demand Fulfillment application helps organizations to quote and promise order delivery to customers in real-time while obeying customer constraints on lot sizes, number of shipments, and time between shipments. The 32 Supply Chain Planner helps provide a global view of the entire supply chain from sourcing to delivery. These products handle the complicated scheduling for large, distributed, complex manufacturing environments. However, any automated planning and scheduling system can only produce accurate results if inputs to the system are accurate.

Most businesses schedule manufacturing activities based upon forecasts of demand for products. Work is typically scheduled on a daily or weekly basis to meet demand predicted based on past sales. Inputs to the automated planning and scheduling system are demand forecasts.

To ensure that demand is satisfied, most factories maintain inventories of both parts and/or raw materials. Each type of inventory typically includes stock to accommodate the average usage rate and stock to meet variations in demand. However, maintaining high inventory levels does not necessarily guarantee that the right inventory is available when and where it is needed. A material delivery schedule is needed that delivers material to the manufacturing line prior to the time the material is needed during manufacturing.

Furthermore, due to limited space in most factories and the expense of maintaining warehouses of inventory, it is desirable to maintain only the minimum inventory necessary to meet demand. Some factories operate on a build-to-customer-order model where no product is manufactured unless it has been ordered by a customer. This model enables the factory to operate with minimal inventory of finished products, but does not address the inventories of materials.

In addition to minimizing material inventory, it is also desirable to minimize material handling to ensure that materials are delivered to the right location at the right time.

Problems with scheduling manufacturing activities are exacerbated in a mass production manufacturing environment for commodities that are built to customer orders. The term commodity describes a mass-produced unspecialized product. In such an environment, the timeframes for manufacturing and delivery activities may be sub-hourly. Demand forecasts do not reliably predict material needs at this level, and schedules based upon demand forecasts become less and less accurate as time elapses between the time the work is scheduled and the time the work is initiated on the manufacturing line. Nor do demand forecasts respond to variations in material needs resulting from atypical customer orders. Scheduling based upon demand forecasts does not provide the responsiveness to changes in inventory and work schedules needed to ensure that materials are delivered to the right place at the right time.

It is known for a new plan generated from demand and supply data to consider previously requested materials (e.g., Purchase Orders or similarly generated requests) and consider previously unrequested availability to be available at fixed lead times (e.g., at X business days or Y hours in the future). A current planned request typically relied on an assumption of the static nature of all previous demand and supply inputs that were provided to the current plan generation.

More specifically, referring to FIG. 1, labeled prior art, when executing a planning cycle x-1, a planned request from a supplier does not take into account actual deliveries made by the supplier during the planning cycle (e.g., a supplier may only deliver material in pallets of 100 despite having a supply request of 90). Accordingly, at the end of the planning cycle x, the manufacturer may actually be in receipt of 10 more items than actually needed. This excess is acknowledged in planning cycle x+1 and actually taken into account when the x+1 plan is executed.

It is known for transportation management software vendors to implement business rules logic to make logistics routing decisions. These systems often focus on batch processing. Known systems optimize logistics through a process of analyzing a batch of pending shipments and identifying opportunities to consolidate shipments and to make parcels into less than truckload (LTL) shipments, LTL shipments into truckload shipments, etc. These processes use batches of orders to optimize the shipping logistics.

SUMMARY OF THE INVENTION

Accordingly, a system which provides a cost advantage to a manufacturer by moving product via a lower cost shipping method as if the order were shipped via an expedited shipping method is set forth. The system identifies and schedules customer orders via a planning system based upon destination and predetermined shipping times. The system also includes a carrier selection module that is dynamic and considers the time of day that a product is shipping and alters a carrier selection accordingly. The manufacturer uses an outbound transportation network of existing carriers to execute the shipping schedule. The system includes a synchronized production portion as well as a dynamic logistics routing portion. Such a system enables the satisfaction of customer fulfillment desires at a lower cost to the manufacturer.

The synchronized production portion schedules production of orders so that opportunity orders may be identified and driven to their completion based upon desired ship time windows. More specifically, the planner application identifies opportunity orders based on a customer's fulfillment desire, a destination state, a size of the order and the time of day that the schedule is being generated. The planner application may thus schedule orders to complete manufacturing within a target completion time so that the shipping application may route the order via a lower cost shipping method while attaining a desired delivery time. For example, an expedited (e.g., next day) order may be shipped via ground transportation while still arriving at the customer's destination as if the order were shipped via air transportation.

The dynamic logistics routing portion includes dynamic carrier selection logic which considers the time of day that a product is shipping to determine a preferred carrier mode. The dynamic logistics routing portion enables shipment of next day product via a lower cost shipping method (e.g., ground transportation) during designated time windows specific to particular facilities, potential carriers and carrier hubs. The carrier selection logic is table driven and thus can accommodate network changes.

In one embodiment, the invention relates to a method for scheduling manufacture of an item in a factory which includes planning a time for manufacturing an item so as to have the manufacture of the item complete during a desired shipping window, determining the desired shipping window so as to allow the item to be shipped via a lower cost shipping method while arriving at a destination as if shipped via an expedited shipping method, and determining a carrier service for shipping the item so as to enable the item to be shipped via a lower cost shipping method while arriving at a destination as if shipped via an expedited shipping method.

In another embodiment, the invention relates to a method for scheduling manufacture of an item in a factory which includes planning a time for manufacturing an item so as to have the manufacture of the item complete during a desired shipping window, determining the desired shipping window so as to allow the item to be shipped via a lower cost shipping method while arriving at a destination as if shipped via an expedited shipping method, and choosing from one of a plurality of carrier services for shipping the item so as to enable the item to be shipped via a lower cost shipping method while arriving at a destination as if shipped via an expedited shipping method.

In another embodiment, the invention relates to a system for scheduling manufacture of an item in a factory which includes means for planning a time for manufacturing an item so as to have the manufacture of the item complete during a desired shipping window, means for determining the desired shipping window so as to allow the item to be shipped via a lower cost shipping method while arriving at a destination as if shipped via an expedited shipping method, and means for determining a carrier service for shipping the item so as to enable the item to be shipped via a lower cost shipping method while arriving at a destination as if shipped via an expedited shipping method.

In another embodiment, the invention relates to a system for scheduling manufacture of an item in a factory which includes means for planning a time for manufacturing an item so as to have the manufacture of the item complete during a desired shipping window, means for determining the desired shipping window so as to allow the item to be shipped via a lower cost shipping method while arriving at a destination as if shipped via an expedited shipping method, and means for choosing from one of a plurality of carrier services for shipping the item so as to enable the item to be shipped via a lower cost shipping method while arriving at a destination as if shipped via an expedited shipping method.

In another embodiment, the invention relates to an apparatus for scheduling manufacture of an item in a factory which includes a time planning module, a shipping window module and a carrier service determining module. The time planning module plans a time for manufacturing an item so as to have the manufacture of the item complete during a desired shipping window. The shipping window module determines the desired shipping window so as to allow the item to be shipped via a lower cost shipping method while arriving at a destination as if shipped via an expedited shipping method. The carrier service determining module determines a carrier service for shipping the item so as to enable the item to be shipped via a lower cost shipping method while arriving at a destination as if shipped via an expedited shipping method.

In another embodiment, the invention relates to an apparatus for scheduling manufacture of an item in a factory which includes a time planning module, a shipping window determining module and a carrier service choosing module. The time planning module plans a time for manufacturing an item so as to have the manufacture of the item complete during a desired shipping window. The shipping window determining module determines the desired shipping window so as to allow the item to be shipped via a lower cost shipping method while arriving at a destination as if shipped via an expedited shipping method. The carrier service choosing module chooses from one of a plurality of carrier services for shipping the item so as to enable the item to be shipped via a lower cost shipping method while arriving at a destination as if shipped via an expedited shipping method.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 shows a table setting forth exemplative hubs, along with corresponding ground cut off time, sort times, and travel times.

DETAILED DESCRIPTION

Figure 1:
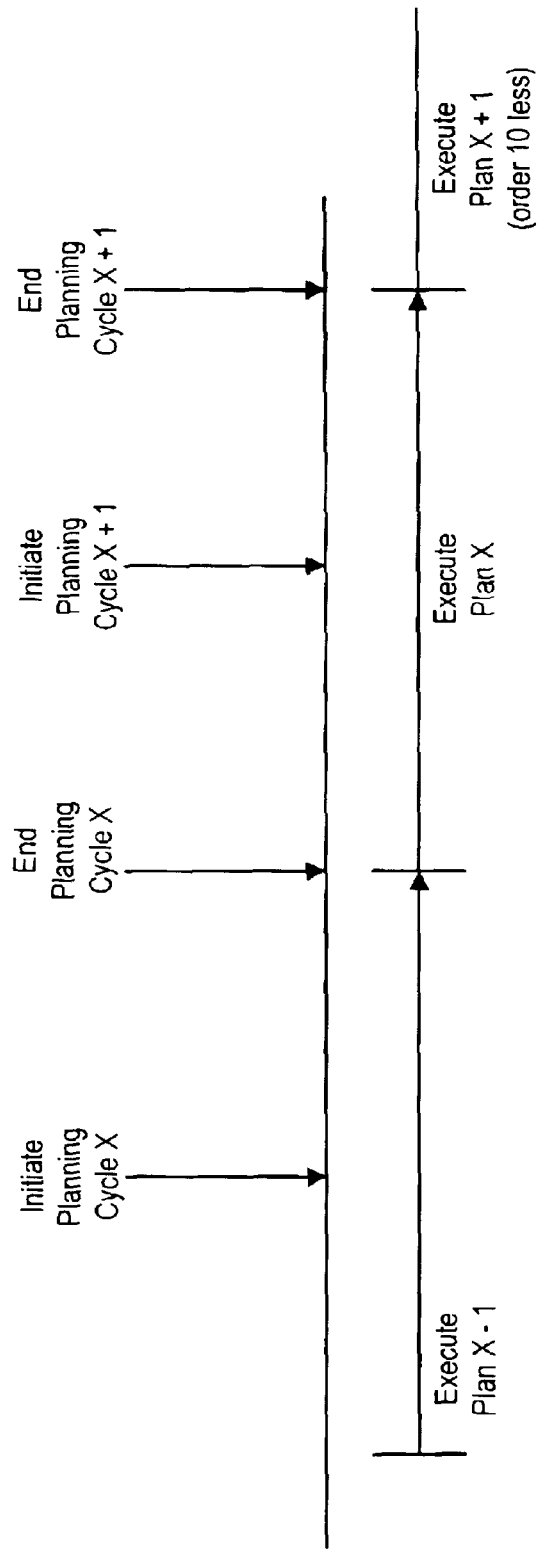
FIG. 1, labeled prior art, shows a timeline for planning requests.

The following is intended to provide a detailed description of an example of the invention and should not be taken to be limiting of the invention itself. Rather, any number of variations may fall within the scope of the invention which is defined in the claims following the description.

In the logistics routing system and method of the present invention, the production is synchronized with routing so as to enable logistics routing so as to provide a cost advantage to a manufacturer by moving product via a lower cost shipping method while attaining a desired delivery schedule.

When a quantity of a material is scheduled to be used at an operation on a manufacturing line, the material is requested from the available inventory allowing sufficient time for delivery prior to the time the material is needed at the operation. When the material is accepted at the destination material source, the actual quantity of material that is received is compared against planned requests that occur during the execution of a plan and the planned requests are modified if necessary.

In the described manufacturing environment, a customer places a customer order for one or more products, such as an information handling system. A customer may be an individual or a business entity. The product(s) are built according to the specifications provided by the customer in the customer order and may include one or more components. Generally each component is a commodity that is mass-produced and unspecialized. For example, the customer ordering an information handling system may specify several components such as a processor, monitor, printer, and so on, each of which is mass-produced. The customer order specifics the particular components to be assembled to provide the information handling system product. As part of the order, the customer identifies a desired delivery schedule, such as next day deliver, three day deliver, etc.

For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For simplification purposes, examples used herein may describe a customer order for a single item, an item may represent either a product or a component of a product as described above. The scope of the invention is not so limited, and the invention encompasses the fulfillment of customer orders for multiple products including multiple components. A customer order therefore may include many items and/or multiple quantities of a single item. When a customer order has a single item, as in some examples herein, the assignment of a manufacturing line to fulfill the customer order by manufacturing the item is also an assignment of a manufacturing line to the customer order.

Some items may be manufactured by the manufacturer and other items may be purchased from a supplier but sold as part of a product offered to customers. For instance, the manufacturer of the computer system described above may obtain a monitor from a supplier rather than manufacture the monitor itself.

The term material describes raw materials and/or parts used to manufacture an item. For items which are purchased from a supplier and not manufactured in-house, the term material may be used to describe the item itself.

The demand fulfillment system and method of the present invention generates a work schedule for items to be manufactured and a material delivery schedule for materials to be delivered to manufacture the items.

A work schedule includes a time and location for each item to be manufactured. The location may specify a manufacturing line and/or an operation of at least one operation on a manufacturing line to manufacture the item. A material delivery schedule identifies a material, a quantity, a material need-by time, and a delivery location (an operation and/or manufacturing line) for each material required to fulfill the work schedule. The material delivery schedule is used to ensure that materials needed to manufacture the items are delivered to the location they are needed on the manufacturing line prior to the time when manufacturing the item is to begin. The material delivery schedule is developed on a just-in-time basis so that materials are delivered to the manufacturing line just prior to the time that the material is needed for manufacturing the item.

Figure 2:
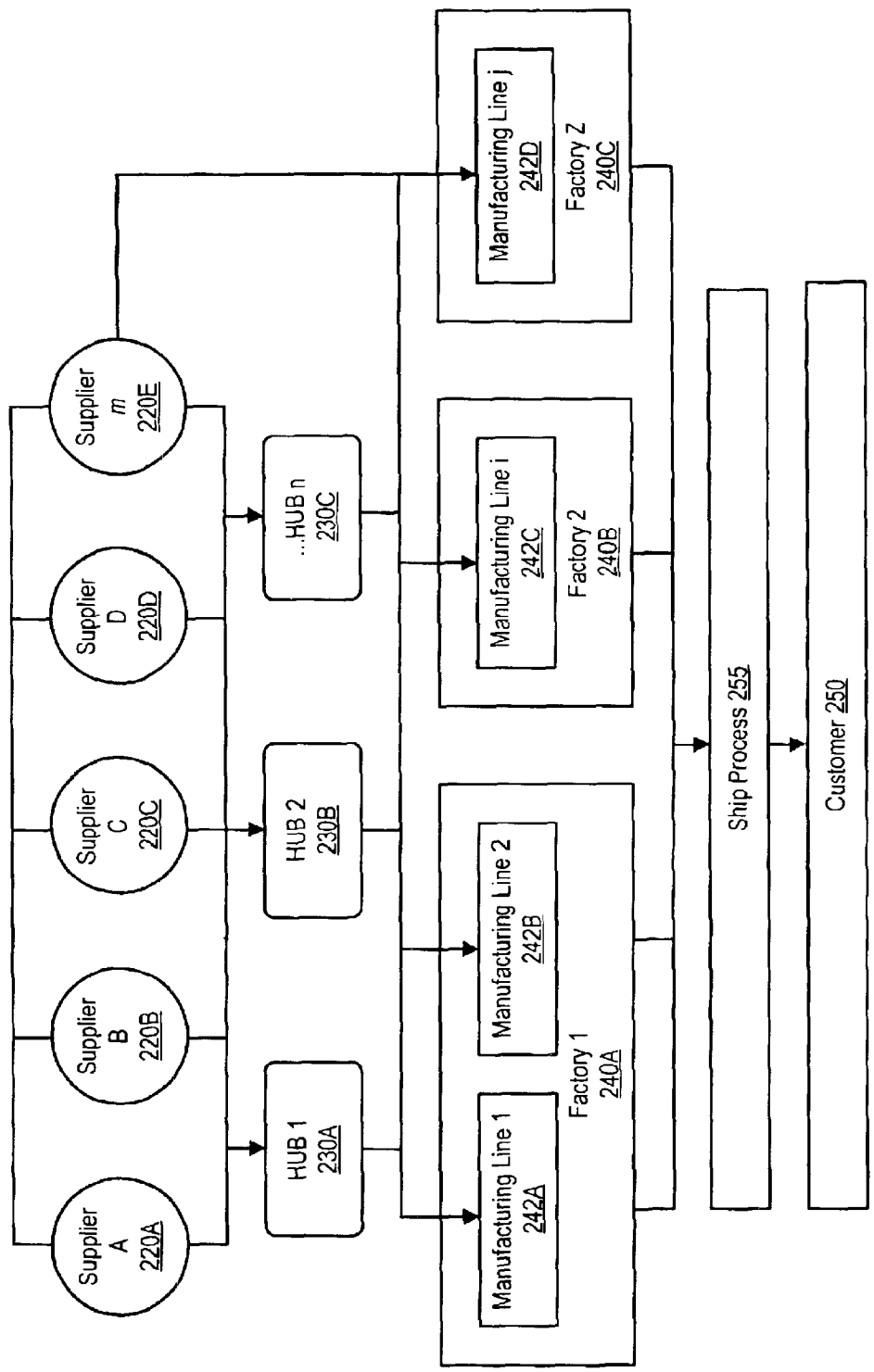
FIG. 2 is a flow diagram showing an example of a supply chain for a manufacturer having several factories.

FIG. 2 shows a supply chain for a manufacturer of items according to one embodiment of the invention. Each supplier 220 such as suppliers 220A through 220E supplies parts and/or raw materials, collectively called materials, to the manufacturer. Rather than maintaining a warehouse of materials, the manufacturer obtains materials from at least one external material source. Examples of external material sources include hub 230A, hub 230B, and hub 230C and suppliers 220A through 220E. Each hub is in close proximity to one of the manufacturer's factories, each factory being a factory 240, such as factories 240A, 240B and 240C. Each factory has at least one manufacturing line such as manufacturing lines 242A through 242D. Each manufacturing line may have one or more manufacturing operations (not shown). For factories having multiple manufacturing lines, materials from hubs and suppliers are delivered directly to the operation and/or manufacturing line that needs the material rather than to a general delivery area that serves all operations and/or manufacturing lines for the entire factory.

The term supplier hub describes an intermediate business that agrees with the manufacturer to maintain adequate levels of inventory of materials that can be delivered to the manufacturer's factory on short notice upon request. The hub makes its own arrangements with suppliers to provide material to a storage location for hub inventory. A supplier hub may be referred to as a Supplier Logistics Center (SLC).

Suppliers may also supply parts and/or raw materials directly to the operation and/or manufacturing line upon request. In the context of the present invention, each external material source such as a hub or a supplier has its own inventory data (not shown). The manufacturer has access to the external material sources' inventory data. The manufacturer manufactures the finished products that have been ordered by customers such as customer 250.

The orders are shipped to the customer via a shipping process such as shipping process 255. Shipping process 255 enables a cost advantage to the manufacturer by moving product via a lower cost shipping method as if the order were shipped via an expedited shipping method. The shipping process 255 identifies and schedules customer orders via a planning system based upon destination and predetermined shipping times. The shipping process 255 may also determine carrier selection dynamically as well as considering the time of day that an order is shipping and altering a carrier selection accordingly. The manufacturer uses an outbound transportation network of existing carriers to execute the shipping schedule. The shipping process 255 includes a synchronized production portion as well as a dynamic logistics routing portion. Such a shipping process 255 enables the satisfaction of customer fulfillment desires at a lower cost to the manufacturer.

Figure 3:
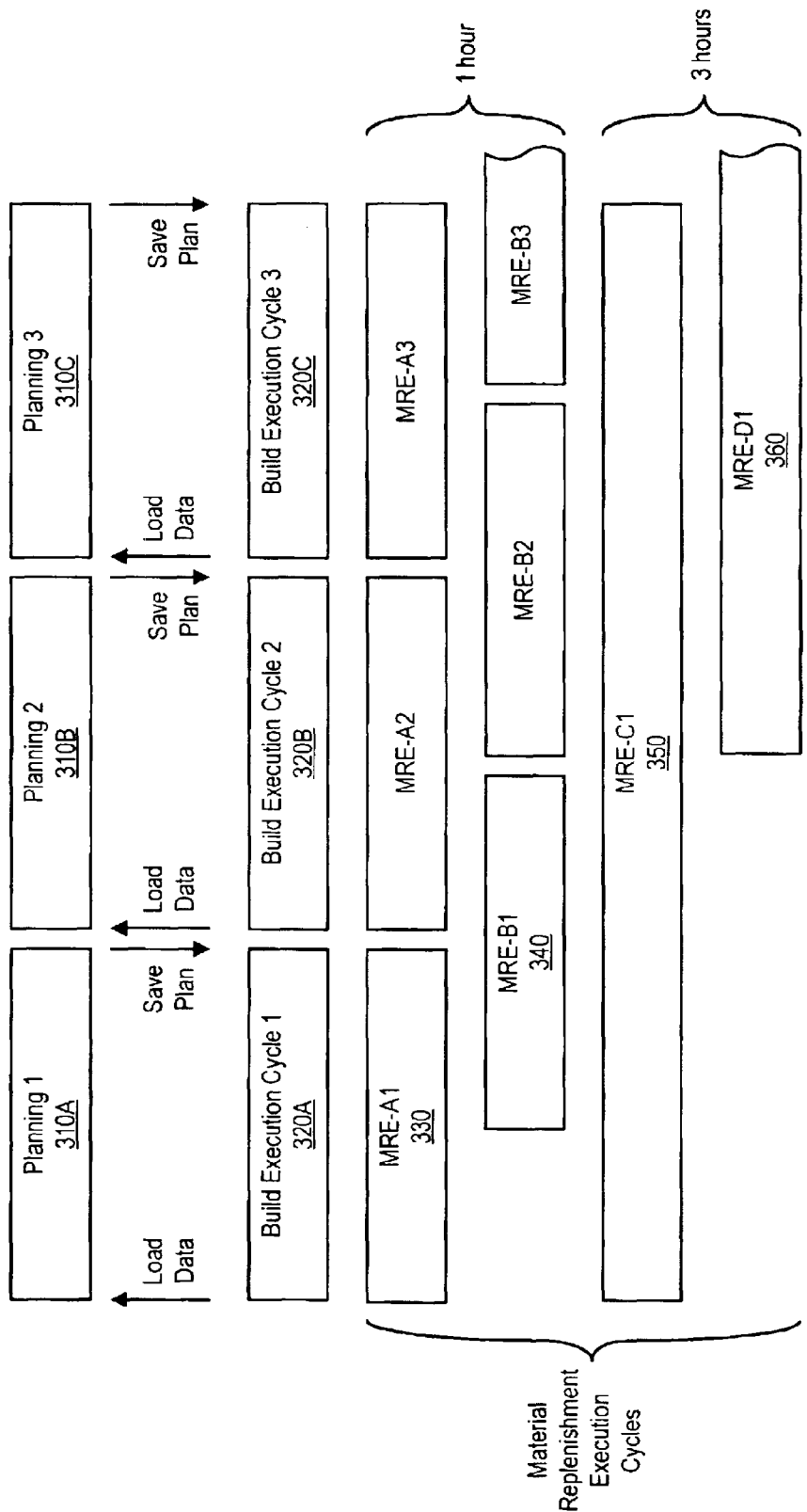
FIG. 3 shows a timeline for scheduling work and delivery of materials for a manufacturing line, receiving deliveries of material from a hub, and initiating work on the manufacturing lines according to the work schedule.

FIG. 3 shows an example of a timeline of activity on a manufacturing line according to the present invention. In this example, production scheduling activity (i.e., planning) is decoupled (i.e., executed separately) from material replenishment or fabrication activity (i.e., plan execution). The fabrication activity includes some or all of schedule transmission, materials requesting, build execution activity, and material movement. The production scheduling activity is executed substantially continuously as are materials requested from external material sources. The production scheduling activity accounts for planned initiation of material requests when generating a material request. Planned initiation of material requests are material requests that are anticipated to occur during the execution of the production scheduling module. The production scheduling activity includes planning fabrication activity so that the fabrication activity is synchronized with a desired routing schedule.

More specifically, at time 0:00, data is loaded into a planning module 310A so that a first production scheduling and planning cycle may be executed (Planning 1). The data that is loaded includes customer orders and available inventory. The planning module 310A develops a material request plan that schedules work and deliveries of materials to the factory's operations and/or manufacturing lines. Available inventory includes external inventory as shown in external inventory data, in this case, the hub's inventory data. Available inventory also includes in-house inventory of materials that were requested and delivered from an external material source, but that are not currently allocated to a customer order.

The timeline shows three examples of planning blocks that occur during an example time period: planning block 310A beginning at time 0:00, planning block 310B beginning at time 2:00, and planning block 310C beginning at time 4:00. For illustration purposes, planning block 310A is shown prior to any delivery of material to the manufacturing line. Planning blocks 310B and 310C illustrate scheduling after some material has been delivered by hubs to the manufacturing lines. This material from hubs was requested from the hubs during a preceding planning block. For example, for planning block 310C, available inventory includes in-house inventory of materials that were requested as a result of the plan developed during the execution of planning module 310B and delivered during hub delivery block 330. Available inventory also includes materials available from external material sources, as shown in external inventory data.

However, because the production scheduling activity is decoupled from the material movement activity, a material request and movement block 320A may execute before the planning block 310A completes (e.g., at time 0:15). The material request and movement block 320A uses information derived from a prior planning block (not shown). In this way, material request and movement are not dependent upon the execution of a particular planning block.

In the example shown in FIG. 3, each planning block allows a set amount of time to generate a schedule (e.g., approximately one hour or two hours). The set amount of time for the planning block is based upon the length of time that the planning software needs to run. In each planning block, such as planning block 310A beginning at time 0:00, a schedule is generated for operations on manufacturing lines using outstanding customer orders and available inventory. The scheduling takes into consideration variables relating to how many hours of work have been scheduled versus factory capacity, parts shortages, engineering holds on order, etc. A schedule includes a work schedule for work to manufacture items in response to outstanding customer orders and constrained by material availability (i.e., a build execution schedule). A schedule also identifies material requirements and may provide a material requirements schedule for materials to be used to perform the work. The work schedule identifies the items to be manufactured and a start time and location (operation and/or manufacturing line) for manufacturing each item.

The schedule also takes into account a time for manufacturing an order so as to have the manufacture of the order complete during a desired shipping window. The desired shipping window is determined so as to allow the order to be shipped via a lower cost shipping method while arriving at a destination as if the order were shipped via an expedited shipping method.

The customer order identifies the materials that are needed to manufacture the item. An availability scheme may be used to assign inventory to a particular customer order to be built. It is desirable to use the most readily available material and thus material is provided with an associated availability rating. For example, in one embodiment, unused in-house inventory already at the storage room for the manufacturing line assigned to the customer order receives the highest availability rating to be used in the next work schedule. In-house inventory stored in an excess stock storage room in the factory is given second highest availability rating; hub inventory is given the third highest availability rating; and in-house inventory in a storage room for another manufacturing line is given the lowest availability rating. This availability scheme minimizes in-house moves of materials. Other embodiments may use other methods or other priority schemes to assign materials to customer orders.

A material delivery schedule (i.e., a material replenishment execution schedule) is developed from the work schedule and the manufacturing requirements so that all materials to be used in manufacturing an item are available at the operation and/or manufacturing line at the time needed for manufacturing the item. The material replenishment execution schedule may include staggered delivery of materials to the manufacturing line as items are being manufactured, as long as the material is available at the operation and/or manufacturing line when it is needed (See, e.g., MRE-A1 to A3, MRE-B1 to B3, MRE-C1 and MRE-D1).

Multiple planning blocks may occur during a single manufacturing shift. The term manufacturing shift describes a typical manufacturing shift of approximately 8 hours during which mass production of items is continuously performed, although the number of hours in a manufacturing shift may vary. The multiple planning blocks produce work schedules and material delivery schedules for a single manufacturing line during each manufacturing shift. Each subsequent planning block overlays a revised work schedule and material delivery schedule over the previously planned work schedule and material delivery schedule. The planning blocks produce a rolling work schedule and material schedule that extends beyond the manufacturing shift. Planning work and material deliveries multiple times during the shift enables the factory to respond to changing material needs of each manufacturing line on a very short-term basis. The schedule produced is used to initiate a work schedule after the planning block ends and to generate a material delivery schedule for deliveries until a revised material delivery schedule is generated by a subsequent planning block. Accordingly, when a new planning block occurs, the schedule generated overlays all existing material requests which have not already been sent.

Replenishment time (i.e., lead time) for material is dynamically calculated when planning work schedules. For example, if material that is needed is part of hub inventory, the work schedule allows for the replenishment time to move the material from the hub inventory to the manufacturing line. Work using that material is not scheduled until after the replenishment time has passed. Replenishment time may also be needed for in-house inventory, but it should be shorter than the replenishment time needed for an external material source. Replenishment lead time for materials that are currently at the hub is calculated based on the expected time for the planning block to complete, the time needed by the manufacturer to evaluate and adjust material requirements, the time needed by the hub to consolidate materials, load the truck and transport the material to the factory, the static delivery schedule for that hub to that factory and the time needed to move materials to the location where the materials will be consumed.

By taking account of replenishment time in planning work, the planning system ensures that work is not scheduled to begin until all parts and/or materials needed for manufacturing the item are delivered to the operation and/or manufacturing line. Orders are not scheduled that cannot be completed due to missing parts.

At time 1:00, the plan is provided to the manufacturing line and work included in the work schedule. Each new materials request is based upon the latest saved plan data and thus the material requests and execution block 320B use the saved plan from planning block 310A.

The materials delivered prior to the next planning block are available as inventory for work to be subsequently scheduled. For example, materials that arrive prior to the execution of the planning block 310B are available as part of in-house inventory for planning block 310B. According to the present invention, material is requested so that the material received in response is available at the manufacturing line just in time for manufacturing the item. Material requests are made to ensure that a delivery of material in response to the material request is destined for a single manufacturing line.

Each planning block such as planning blocks 310A, 310B, and 310C produces another work schedule using all available customer orders and all available inventory. Additionally, build execution cycle blocks 320A, 320B, and 320C and material replenishment execute cycle (MRE) blocks 330, 340, 350 and 360 use the most recent saved plan to generate materials requests.

In the embodiment shown in FIG. 3, the work schedule is generated independently of previously generated work schedules, although other embodiments may update a previously generated work schedule. Additionally, subsequent planning blocks, when loading new data, add materials that the planning block plans to order during the planning run as planned in-transit materials. Additionally, supplier commitments to earlier requests are compared with the original requested quantity. Net differences are used to adjust new requests. Often the work schedule generated at a given time corresponds directly to the work schedule generated in a later planning block, for the work scheduled for the same time period. However, changes in customer orders and available inventory during the time between planning may result in differences between work schedules and thus the new schedule overlays the previous schedule.

Figure 4:
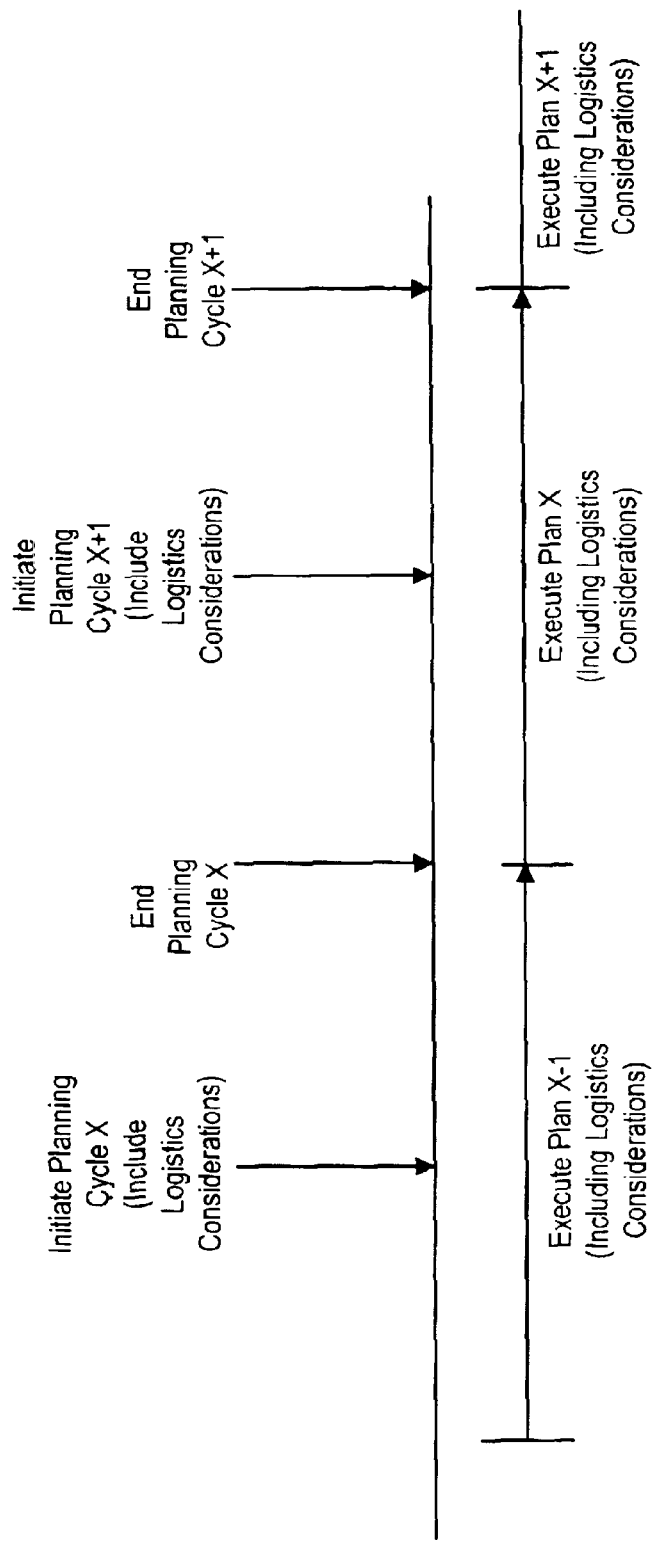
FIG. 4 shows a timeline for recalculating planned requests based upon events that occur during a planning cycle.

FIG. 4 shows a timeline for recalculating planned requests based upon events that occur during a planning cycle. More specifically, when executing a planning cycle x−1 and a planned request from a supplier (which request may have been from planning cycle x−2) results in actual deliveries of more material than is planned requested, then during the executing of planning cycle x−1, a planned request for the same material acknowledges that this excess material is being delivered, takes this excess material into account when executing a planned request during the x−1 execution cycle and revises the planned request so as to reflect the excess material. I.e., the planned request during the x−1 planning cycle is recalculated to be the planned request minus overage delivered and the original plan is revised to reflect the new planned request. Delivered material includes both committed deliveries as well as actual deliveries. The delivery may occur prior to or after a planned request as long as the delivery is committed, the delivery is netted out. Additionally, at the end of the execution of planning cycle x−1, the planned requests are again reviewed to determine whether there is any remaining overage. If so, then this overage is taken into account (i.e., netted out) when performing future requests and as input data for the next planning cycle.

Figure 5:
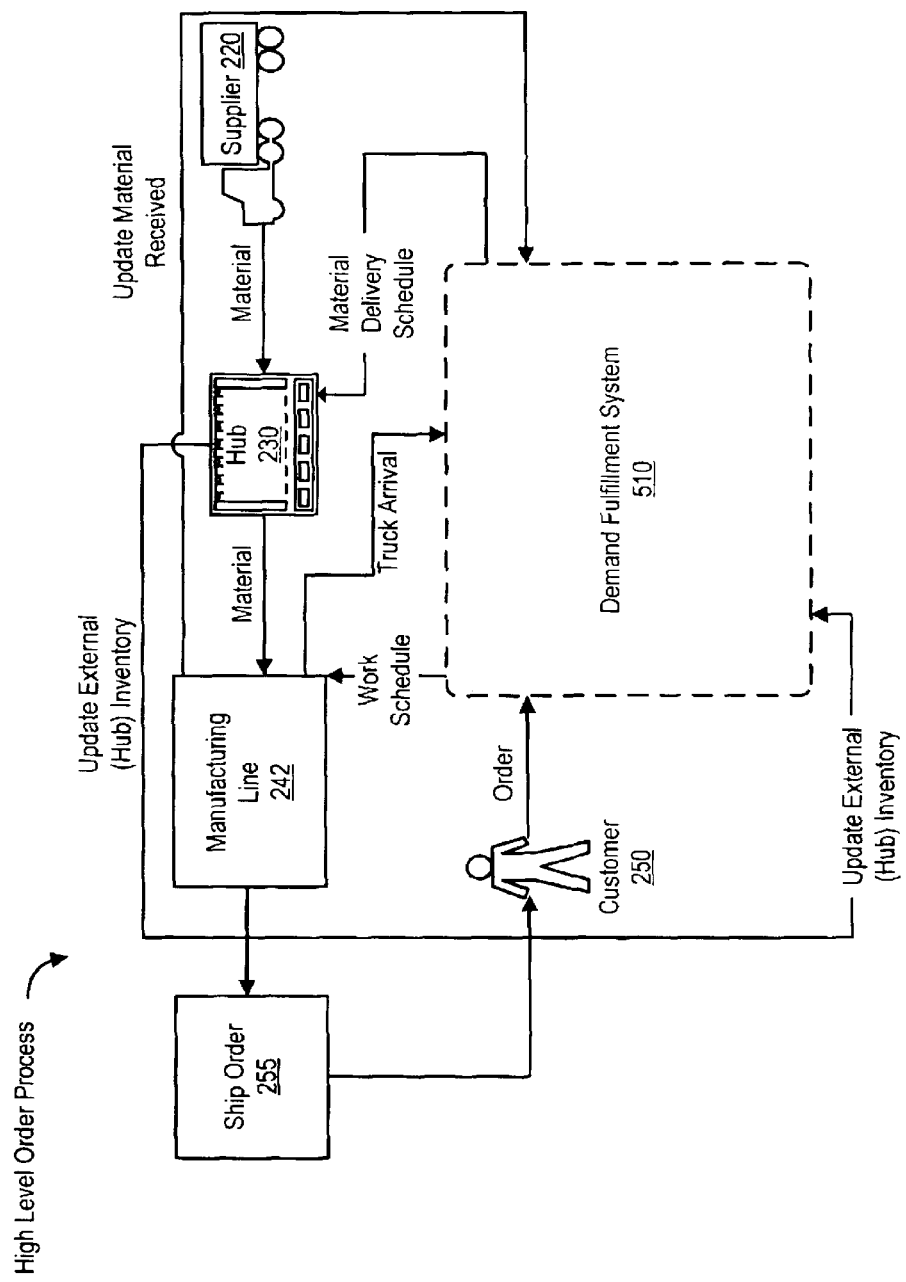
FIG. 5 shows a high level order process which includes a demand fulfillment system of the present invention.

FIG. 5 shows the interaction of the demand fulfillment system 510 with a high level order process. More specifically, the demand fulfillment system 510 is coupled to and interacts with the manufacturing line 242. The demand fulfillment system 510 also interacts with and is coupled to a suppler hub 230, which is an example of an external material source. The suppler hub 230 receives material from suppliers 220 and provides material to the manufacturing line 242. The hub 230 receives information regarding material delivery schedule from the demand fulfillment system 510. The demand fulfillment system 510 also provides information regarding a work schedule to the manufacturing line 242 and receives information regarding material arrival from the manufacturing line 242. The demand fulfillment system 510 also recalculates planned requests during the execution of the planning cycle based upon actual material delivered. The manufacturing line 242 ships the product to the customer 250 via the shipping process 255.

Figure 6:
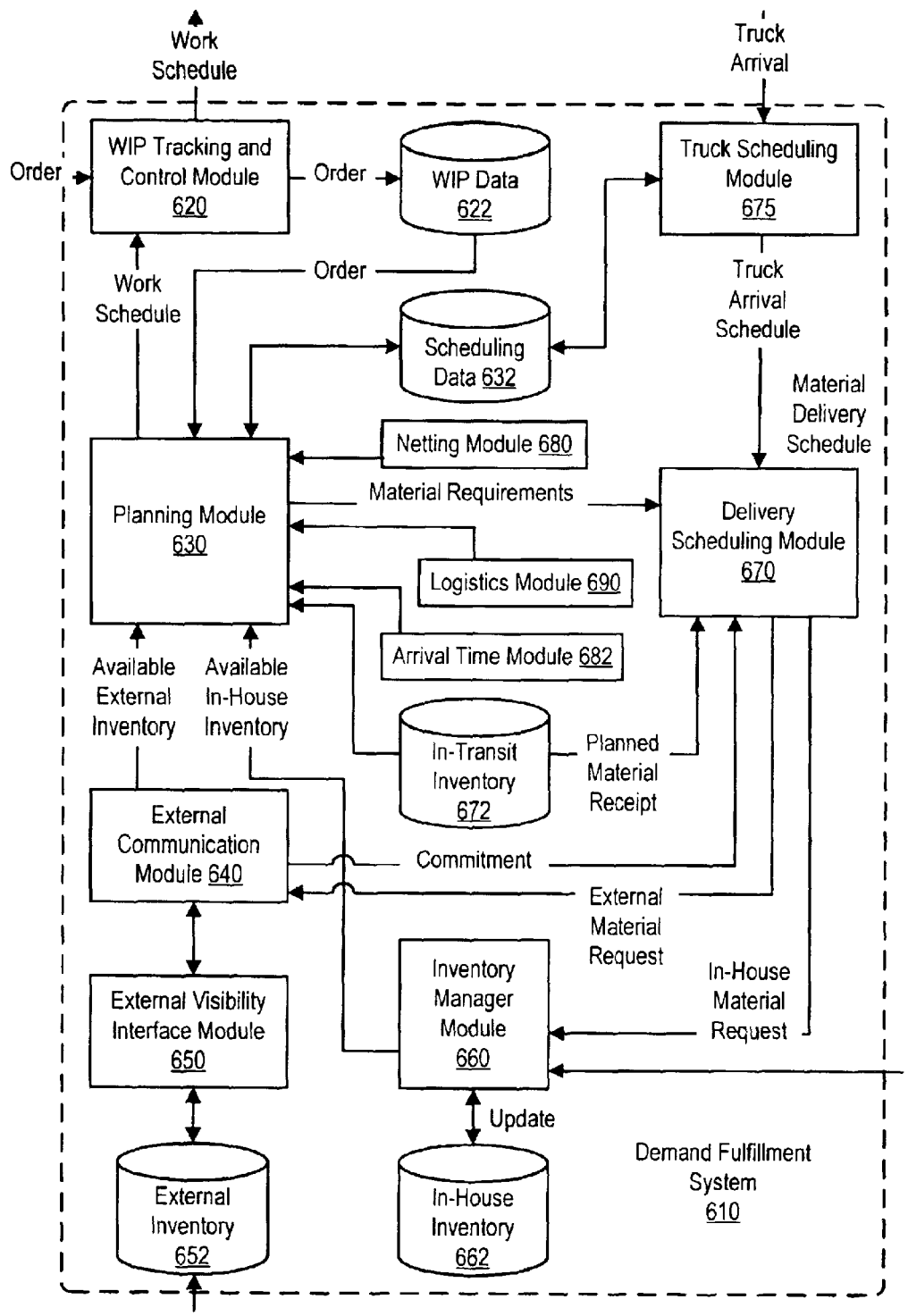
FIG. 6 shows the demand fulfillment system of the FIG. 5 high level order process.

FIG. 6 shows the interactions between modules of demand fulfillment system 510. In one embodiment, the functions of planning module 630 are provided by i2 Factory Planner. The invention is not limited to this embodiment, and the functions performed by each of these modules may be performed by modules specially developed for the demand fulfillment system, by a single module, or by other commercially available software.

In some embodiments, the functions of some modules of demand fulfillment system 510 may be provided by commercially available software packages. Other modules may manipulate the inputs and/or outputs as well as provide the necessary interfaces to in-house systems or external systems. For example, inputs are manipulated so that the output of the commercially available software packages is accurately based upon demand derived from customer orders, using materials available from in-house and hub inventory, and with replenishment times taken into account in scheduling work and deliveries of materials. Further manipulation of the output of the commercially available software may be necessary.

WIP Tracking and Control module 620 controls work in progress (WIP) in the various manufacturing lines of the manufacturer, such as manufacturing line 242. When a customer 250 places a customer order, WIP Tracking and Control module 620 stores the customer order in WIP data 622 which is available to Scheduling module 675.

Planning module 630 develops a work schedule using the customer order and various other inputs, as will be described below. Ultimately, Planning module 630 provides the work schedule that is used by WIP Tracking and Control module 620 to control the operations performed on the manufacturing lines, such as manufacturing line 242. Planning module 630 also provides the material requirements that will be needed to perform the work schedule. Delivery Scheduling module 670 uses the material requirements to develop a material delivery schedule for delivery of materials to the operations and/or manufacturing lines.

Planning module 630 also compares the parts and/or raw materials needed to fulfill the customer order with available inventory to determine whether additional materials are needed to manufacture an item of the customer order. Because minimal inventory is maintained at the manufacturing lines, material requests must be issued to move materials to the manufacturing line, both from in-house inventory and from external inventory. Available external inventory and available in-house inventory comprise the available inventory that may be used to fulfill the material request. Planning module 630 may use and/or generate schedule data 632 to determine materials to perform certain work; for example, the material replenishment time may be used as part of identifying available inventory to fulfill the customer order.

Delivery Scheduling module 670 determines when a material request should be generated, typically at the last possible moment that will still meet a request deadline. The materials received in response to in-house material requests and external material requests are expected to be in place when the material is needed for manufacturing the item. Delivery Scheduling module 670 generates an in-house material request to Inventory Manager module 660, which manages in-house inventory, and/or an external material request such as a hub material request to External Communication module 640.

When Delivery Scheduling module 670 communicates an in-house material request, Inventory Manager module 660 obtains the available in-house inventory from In-House Inventory data 662. Inventory Manager module 660 communicates the available in-house inventory to Planning module 630. Available in-house inventory typically excludes in-house inventory already allocated to another customer order.

External Communication module 640 facilitates communication between the manufacturer and external delivery sources. When Delivery Scheduling module 670 communicates a hub material request, External Communication module 640 determines whether external inventory (here, hub inventory) is sufficient to meet the material request via External Visibility Interface module 650. External Visibility Interface module 650 provides an interface to external inventory data 652, which is data maintained by the external material source (the hub or supplier) rather than by the manufacturer. External Communication module 640 obtains a commitment from the external material source (here, the hub) for the amount of material the hub commits to provide to meet the material request.

External Communication module 640 communicates the available external inventory to Planning module 630. If an external material source cannot fulfill the entire material request, the manufacturer is automatically informed of the shortage via the commitment. The manufacturer can coordinate with the external material source to re-stock external inventory to meet demand and/or use another source.

Netting module 680 communicates net out information to Planning module 630. The netting module 680 nets out from a next material request material that is committed from the hub in excess to the original request. The netting out is based on matching destination and part numbers of the material. The netting module 680 also nets excess receipts from planned requests without waiting for the next planning cycle by identifying actual delivered material versus planned material requests. If an overage is detected, this overage information is provided to the planning module 630. Thus, the netting module 680 prevents over ordering of material.

Arrival Time module 682 communicates material arrival times to Planning module 630. The arrival time module 682 allows an arrival time to be factored into planning. The true arrival time is based upon the time that a truck is scheduled to arrive plus the time to get the material to the manufacturing line (i.e., the replenishment time). Accordingly, a late night execution of the planning module knows that material won't be available until a certain time the next day and will start scheduling orders based upon the true availability of the material.

In one embodiment, the demand fulfillment system and method also tracks in-transit inventory, also shown in FIG. 6 as in-transit inventory 672. In-transit inventory is inventory that has been committed by an external material source but not yet received at the manufacturing line. When a commitment from an external material source is received, Delivery Scheduling Module 670 uses the commitment to update in-transit inventory with a planned material receipt, thereby adding the material to in-transit inventory. In this embodiment, in-transit inventory is considered to be part of the available inventory and is used by planning module 630 for scheduling work. When in-transit inventory is received at the manufacturing line, the material request is "closed" by "zeroing out" the corresponding in-transit inventory and adding the received material to in-house inventory.

Delivery Scheduling module 670 uses the material requirements generated by Planning module 630 and a truck arrival schedule to produce a material delivery schedule. The term truck arrival schedule is used herein to describe scheduled deliveries of available inventory to operations and/or manufacturing lines. A delivery to an operation corresponds to a delivery to an operation material source for the operation. A truck arrival schedule includes in-house deliveries from in-house inventory and/or deliveries of materials from external material sources. The term truck as used herein describes the transport mechanism used to move material from its storage location to the operation and/or manufacturing line.

A truck arrival schedule is used as input for each generation of a material delivery schedule to allow the factory to quickly adapt to changes in material needs and thus to schedule additional or fewer material deliveries.

When materials are received and/or distributed from in-house inventory, this information is entered into Inventory Manager module 660 and in-house inventory data 662 is updated. The arrival of a truck of materials is also entered into Truck Scheduling module 675, which maintains the truck arrival schedule of trucks scheduled to deliver materials from external inventory and/or in-house inventory.

By using a priority scheme to assign materials to customer orders such as that described above, the demand fulfillment system and method of the present invention are designed to ensure that in-house moves of material are rare and that in-house distribution of materials is performed as efficiently as possible. In addition, material requests are made so that each delivery of material is destined for a single operation and/or manufacturing line.

The term automated data warehouse is used to refer collectively to WIP data 622, which provides a outstanding customer orders and a current available work-in-progress inventory of materials in work in progress and not in storage; in-house inventory data 662, which provides a current available in-house inventory of materials for materials that are in stockrooms and at operations but not in work-in-progress, external inventory 652, which provides a current available external inventory at suppliers and hubs; in-transit inventory 672, which provides a current available in-transit inventory; and scheduling data 632, which provides other types of data needed to produce the work schedule and the material delivery schedule. The term current state of the available inventory includes current available work-in-progress inventory; current available in-transit inventory; current available in-house inventory, and current available external inventory. The available inventory included in the automated data warehouse is updated continuously from its respective sources. For example, WIP data 622 is updated by WIP tracking and control module continuously. In the preferred embodiment, data from each of these respective sources is updated no less than every ten minutes.

Logistics module 690 communicates logistics information to Planning module 630. The logistics module 690 includes a synchronized production portion as well as a dynamic logistics routing portion.

The synchronized production portion enables the planning module 630 to schedule production of orders so that opportunity orders may be identified and driven to their completion based upon desired ship time windows. More specifically, the planner module 630 identifies opportunity orders based on information provided by the logistics module 690. The information includes a customer's fulfillment desire, a destination state, a size of the order and the time of day that the schedule is being generated. The planner module 630 may thus schedule orders to complete manufacturing within a target completion time so that the shipping process 255 may route the order via a lower cost shipping method while attaining a desired delivery time. For example, an expedited (e.g., next day) order may be shipped via ground transportation while still arriving at the customer's destination as if the order were shipped via air transportation.

The dynamic logistics routing portion includes dynamic carrier selection logic which considers the time of day that a product is shipping to determine a preferred carrier mode. The dynamic logistics routing portion enables shipment of next day product via a lower cost shipping method (e.g., ground transportation) during designated time windows specific to particular facilities, potential carriers and carrier hubs. The carrier selection logic is table driven and thus can accommodate network changes.

Referring to FIG. 7, an example of the use and effect of a dynamic logistics system is shown. More specifically, a table setting forth exemplative hubs, along with corresponding ground cut off time, sort times, and travel times is shown. More specifically, the hubs represent logistics centers to which orders are directed before then being shipped to the customer of the order. The ground cut off time represents the time by which an order must be en route to reach a particular hub in time for a carrier sort time. The carrier sort time represents the time that a sort occurs for product that will be delivered via ground transportation the next day. The travel time represents the time that it takes based upon a contractually determined transit speed (e.g., 51 miles/hour) to travel from a factory to the appropriate shipper's logistical hub.

Thus, for example, with the shipper's logistical hub located in Atlanta, the ground cut off time by which an order should be loaded on ground transportation in order to reach the shipper's logistical hub before the corresponding sort is 10:30 am.

The table also shows that certain logistical hubs have no applicable travel time and thus are not applicable for the time of day logistics system. For example, with the Meadowlands logistical hub, it is not possible to ship via a lower cost shipping method while arriving at a destination as if the order were shipped via an expedited shipping method. Accordingly, this logistical hub is designated a non TOD hub.

Also for example, some logistical hubs it is always possible to ship via a lower cost shipping method while arriving at a destination as if the order were shipped via an expedited shipping method. Accordingly, these logistical hubs are designated as an all TOD hub. Often, hubs that are designated as all TOD hubs are located close to the factory manufacturing the order so that there is no travel time needed to move the order from the factory to the logistical hub.

Referring to FIGS. 8A–8D, maps setting forth the effect of planning using the dynamic logistics planning system are shown. More specifically, referring to FIG. 8A, when the order is completed and delivered to the shipping facility before midnight, it is possible to deliver the order to a plurality of logistical hubs before the delivery sort for the next day is performed. Accordingly, orders that reach these hubs are delivered as a next day item while using a lower cost shipping method.

Figure 8B:
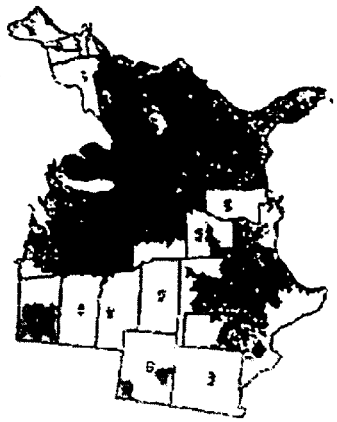
FIGS. 8A, 8B, 8C and 8D show maps setting forth the effect of planning using the dynamic logistics planning system.
Figure 8D:
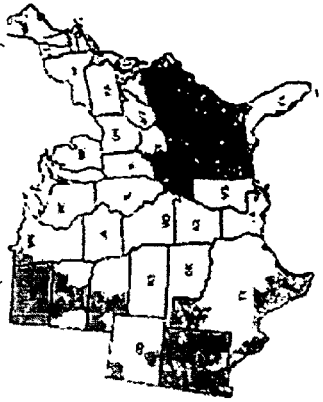
Figure 8A:
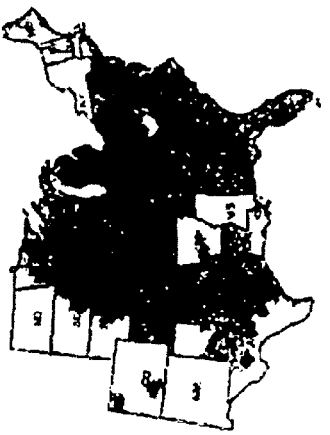
Figure 8C:
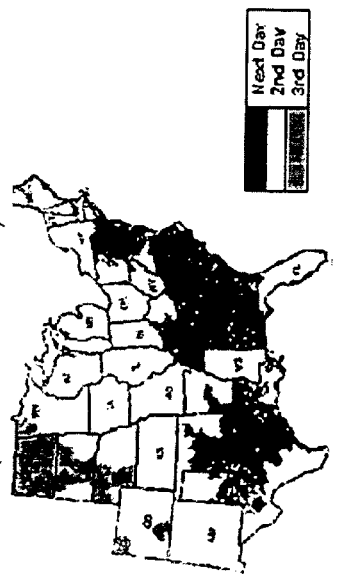

Referring to FIGS. 8B–8D, as the completion time of the order gets later, the logistical hubs to which the order may reach before the delivery sort for the next day become fewer. However, for example, even when the order is completed by 7:00 am on a day of delivery, there are still geographic locations where it is possible to deliver the order the next day using lower cost shipping methods. Accordingly, the planning module 630 can take this into account when scheduling the manufacture of the order to account for the logistical shipping hubs that provide the possibility of next day delivery using lower cost shipping methods.

Figure 9:
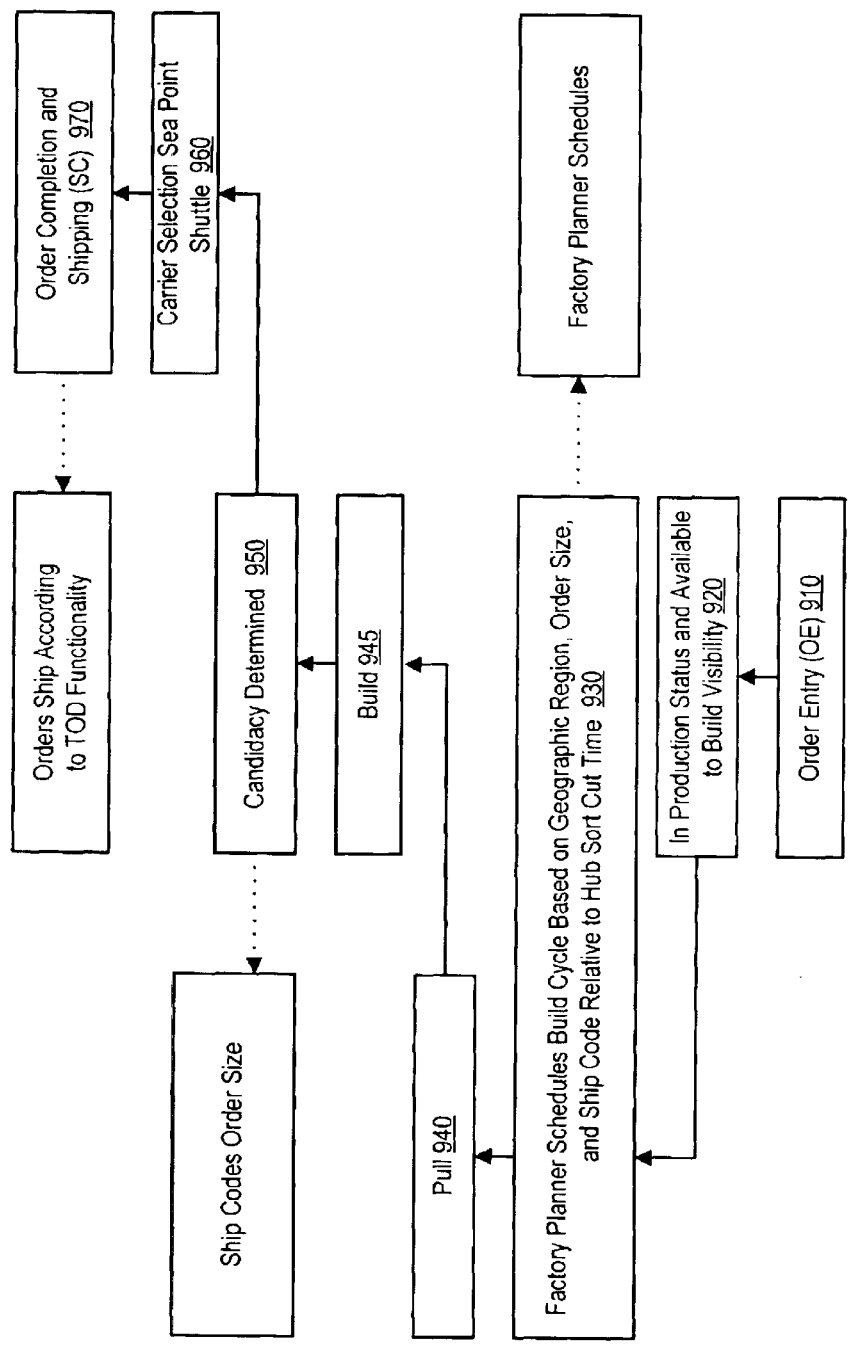
FIG. 9 shows a flow chart of a process flow from order to ship complete.

Referring to FIG. 9, a process flow from order to ship complete is shown. More specifically, when an order is received, the order entry process is instantiated at step 910. Once the order entry is completed then the system determines in production status and available to build visibility at step 920.

Next the demand fulfillment system 610 schedules a build cycle to take into account a desired shipping schedule of the order at step 930. More specifically, this build cycle is based upon a geographic region of the order, the order size and a ship code relative to a hub sort cut time for the order. The demand fulfillment system 610 schedules time of day orders based upon a priority status as compared to the standards of new orders and SLC parts that are allocated. Reno fulfillment center (RFC) orders have a modified due date to ensure an accurate relative position in the available to build (ATB) queue. RFC orders are built earlier because they have more internal processing time (e.g., the transit time from the factory to the fulfillment center). Orders traveling to the fulfillment center are set with an artificially expedited start time to compensate for their travel time to the fulfillment center.

Next, a pull of the parts to fulfill to order is performed at step 940. Next, the system is built at step 945. After the system is built, factors are analyzed to determine whether the system is a candidate for time of day shipping. Factors that are considered include, e.g., ship codes that are associated with the system and the order size. The ship codes include, e.g., next day, 2 d day, 3 d day and 3–5 day shipping codes. Once the order is determined to be a candidate for the time of day shipping, then the order is shuttled from the manufacturing line to the appropriate shipping facility at step 960. Once the order arrives at the appropriate shipping facility, then the order is completed and shipped according to the time of day functionality at step 970.

Figure 10:
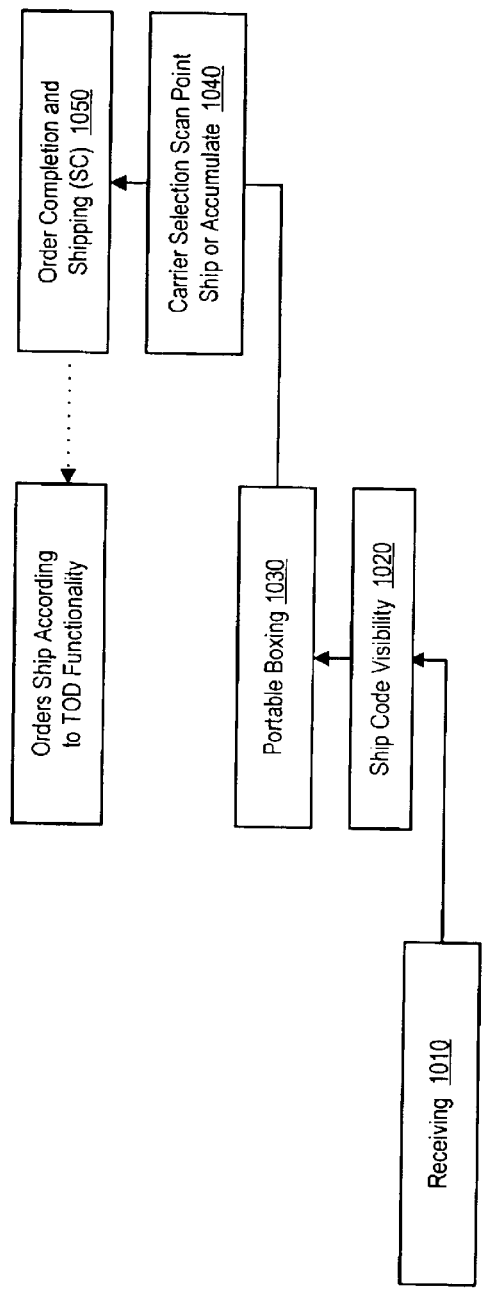
FIG. 10 shows a flow chart of an alternate process flow from order to ship complete.

Referring to FIG. 10, an alternate process flow from order to ship complete is shown. More specifically, certain orders may be fulfilled with less manufacturing activity by the manufacture. With these types of orders, the logistical planning system may still be used to optimize shipping methods. One example of such an order relates to orders for portable information handling systems. Often these portable information handling systems are manufactured at remote locations and then shipped in bulk to the manufacturer. The manufacturer receives these bulk shipments at step 1010. The manufacturer then analyzes orders of the item via ship codes to determine whether any of the orders are candidates for the optimized shipping methods at step 1020. The items are then boxed according to the optimized shipping methods at step 1030. Once the items are boxed (i.e., individually packaged for shipping), then the items are forwarded to the carrier selection scan location where the items are either shipped or accumulated at step 1040. For example, when an order is large enough to fill a truck independently, then that order may be directly shipped. If an order smaller, then that order may be accumulated with other orders going to the same logistical hub. The accumulated orders would then be shipped before the cut off time to the particular logistical hub.

In either case, when the order is completed, the order is shipped at step 1050. The orders are shipped according to the time of day functionality.

Figure 11:
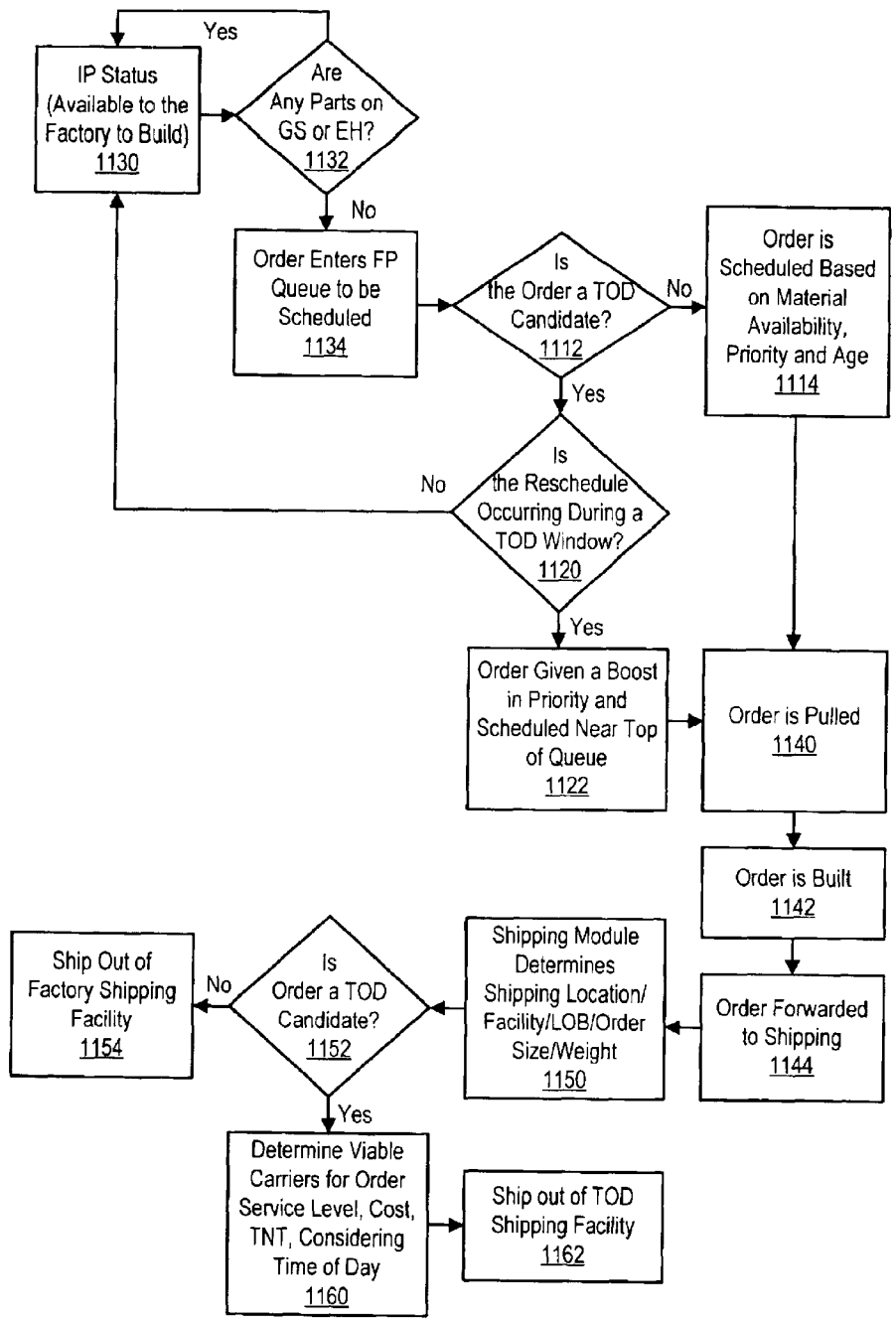
FIG. 11 shows a flow chart of a factory scheduling process.

Referring to FIG. 11, a more detailed flow chart of a factory scheduling process is shown. More specifically, when an order is received at step, the order is reviewed to determine whether the order is a candidate for time of day scheduling (i.e., for dynamic logistics routing) at step 1112. Factors that are considered when determining whether an order is a candidate for time of day scheduling include the destination state of the order, the ship mode of the order, the time that the factory planner rescheduling would begin, the size of the order and the age of the order. If the order is not a candidate for time of day scheduling, then the order is scheduled by planning module 630 without time of day considerations.

If the order is a candidate for time of day scheduling, then the planning cycle is reviewed to determine whether a planning is in process such that the time of day window for the order can be taken into account during a present planning cycle at step 1120. If a planning cycle is in process, then the order is given a boost in priority and scheduled near the top of the manufacturing queue at step 1122.

If a planning cycle is not occurring, then the order is analyzed to determine the initial processing (IP) status of the order at step 1130. I.e., when an order has cleared a credit check and is available to be manufactured, the order is available to the factory and is visible to the planner. When the IP status of the order is determined, then the order is analyzed to determine whether any parts are on global shortage (GS) or engineering hold (EH) at step 1132. When the planner is aware that a part is not available (due, e.g., to a parts shortage), the order is placed on GS status to prevent scheduling of any orders that contain that part. When there is an engineering issue with a particular part or system type then the order may be placed on EH status to prevent an order having those criteria from being scheduled.

If so, then the order is again analyzed by step 1130 to determine the IP status of the order. If not, indicating that all of the parts are available for the order, then the order enters the factory planner queue to be scheduled at step 1134 and then the order is analyzed to determine whether the order is a time of day candidate at step 1112. During the factory planner scheduling, the order may be given a boost to priority based upon the ability of the order to be fulfilled according to the time of day scheduling factors.

After the order is scheduled by the planning module 630, then the parts to complete the order are pulled at step 1140 and the order is built at step 1142. When the manufacturing of the order is completed, then the order is forwarded to the shipping module at step 1144. The shipping module determines a number of shipping characteristics including the shipping location, the shipping facility, the line of business of the order, the order size and the order weight at step 1150. Based upon the shipping characteristics, the order is analyzed to determine whether the order is time of day candidate from a physical shipping perspective at step 1152. If the order is not a time of day candidate, then the order ships out of the factory's shipping facility at step 1154.

If the order is a time of day candidate, then the dynamic logistics routing system determines a carrier service based upon a plurality of shipping characteristics. More specifically, the dynamic logistics routing system determines viable carriers for the order service level, the cost for shipping the order, the time in transit (TNT) while taking into account time of day shipping considerations at step 1160. Once these considerations are determined then the order ships out of the appropriate shipping facility for the carrier service at step 1156.

Figure 12:
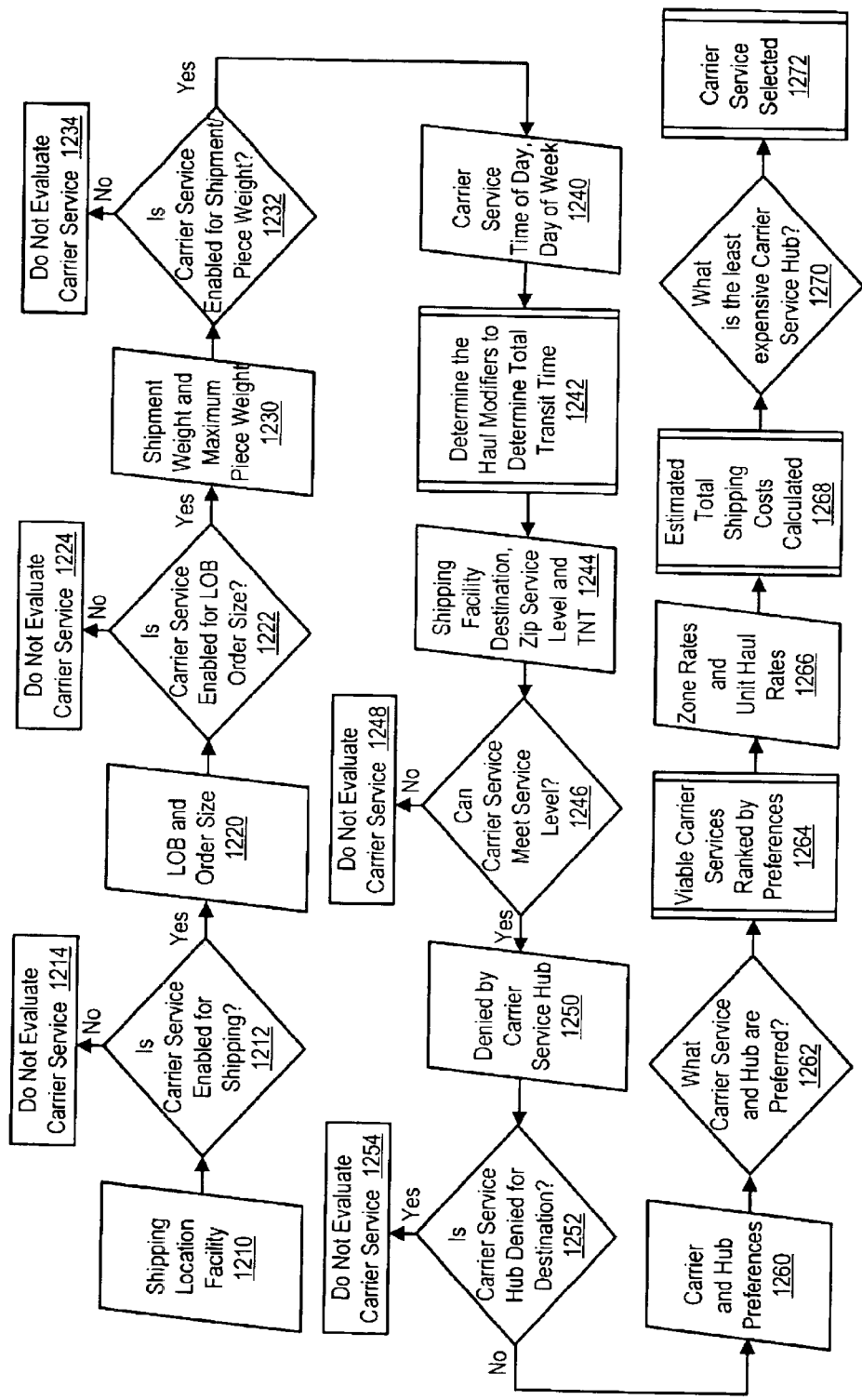
FIG. 12 shows a flow chart of the operation of a dynamic logistics routing system.

Referring to FIG. 12, a flow chart of the operation of a dynamic logistics routing system is shown. More specifically, the dynamic logistics routing system first determines a shipping location facility at step 1210. The system then determines whether a particular carrier service is enabled for shipping at step 1212. If the particular carrier service is not enabled for shipping then the system does not evaluate the carrier service at step 1214. The order then determines the line of business and the size of the order at step 1220. The particular carrier service is then analyzed to determine whether the carrier service is enabled for the line of business and for the order size at step 1222. If the carrier service is not enabled for the line of business and for the order size then the system does not evaluate the carrier service at step 1224.

Next, the system determines the shipment weight and the maximum piece weight of the order at step 1230. The particular carrier service is then analyzed to determine whether the shipment weight and the maximum piece weight of the order at step 1232. If the carrier service is not enabled for the shipment weight and the maximum piece weight of the order then the system does not evaluate the carrier service at step 1234.

Next, the system determines the carrier service time of day and day of week meets the criteria for the order at step 1240. Next the system determines the line haul modifiers to determine the total transit time of the order at step 1242. Next the system determines the shipping facility destination, zip service level and TNT at step 1244. The system then determines whether the carrier service can meet the desirer service level at step 1246. If the carrier service cannot meet the desired service level, then the system does not evaluate the carrier service at step 1248.

The system then determines whether the order is denied by the carrier service hub at step 1250. Next the system determines whether the carrier service hub is denied for the destination of the order at step 1252. If the carrier service hub is denied for the destination, then the system does not evaluate the carrier service at step 1254.

If the carrier service hub is not denied, then the carrier and hub preferences are entered into the system at step 1260. Next the preferred carrier service and hub are identified at step 1262. Next the viable carrier services are ranked by the preferences at step 1264. Next the zone rates and unit line haul rates are determined at step 1266. The estimated total shipping costs are calculated at step 1268. Next, the system identifies the least expensive carrier service hub at step 1270. Then the carrier service is selected by the system at step 1272.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the described embodiment generates a schedule that reflects all outstanding customer orders and all inventory which is then analyzed to produce a work schedule and a material delivery schedule. Other embodiments may use only a subset of outstanding customer orders and available inventory to generate one or more schedules. Such variations are contemplated within the scope of the invention.

Also for example, the described embodiment recalculates planned requests for a single line, recalculating planned requests across multiple lines is also contemplated. Also, when recalculating planned requests across multiple lines, the demand fulfillment system 510 might take into account overages delivered to one line when calculating requests for another line. The demand fulfillment system 510 may take this information into account only for lines that are physically related in some way (e.g., are located within the same factory) or for lines that are producing the same types of items. Accordingly, the demand fulfillment system 510 may identify relationships between multiple lines and use these relationships when netting out planned requests.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for scheduling manufacture of an item in a factory comprising:

planning a time for manufacturing an item so as to have the manufacture of the item complete during a desired shipping window;

determining the desired shipping window so as to allow the item to be shipped via a lower cost shipping method while arriving at a destination as if shipped via an expedited shipping method; and, determining a carrier service for shipping the item so as to enable the item to be shipped via a lower cost shipping method while arriving at a destination as if shipped via an expedited shipping method.

2. The method of claim 1 further comprising obtaining a customer order, the customer order including the item ordered by a customer, the customer order including a desired shipping schedule, the desired shipping schedule corresponding to the expedited shipping method.

3. The method of claim 1 wherein the item is an information handling system.

4. The method of claim 1 wherein the determining a carrier service for shipping the item includes determining a size of the order.

5. The method of claim 2 wherein
the determining a carrier service for shipping the item includes determining a size of the customer order.

6. The method of claim 2 wherein
the order includes line of business information; and
the determining a carrier service for shipping the item includes analyzing the line of business information.

7. The method of claim 2 wherein
the carrier service includes corresponding time of day and day of week information; and,
the determining a carrier service for shipping the item includes analyzing the time of day and day of week information.

8. The method of claim 2 wherein
the carrier service includes corresponding hub information; and,
the determining a carrier service for shipping the item includes analyzing the hub information.

9. The method of claim 2 wherein
the carrier service includes corresponding service level information; and,
the determining a carrier service for shipping the item includes analyzing the service level information.

10. The method of claim 2 wherein
the carrier service includes corresponding shipping cost information; and,
the determining a carrier service for shipping the item includes analyzing the shipping cost information.

11. The method of claim 2 wherein
the carrier service includes corresponding preference information; and,
the determining a carrier service for shipping the item includes analyzing the preference information.

12. The method of claim 2 wherein
the carrier service includes a plurality of carrier service information; and,
the determining a carrier service for shipping the item includes analyzing the plurality of carrier service information.

13. The method of claim 12 wherein
the plurality of carrier service information includes at least two of carrier service shipping location information, line of business and order size information, shipment weight and maximum piece weight information, hub denied for destination information, service level information, shipping facility destination, zip code service level and total in transit information, time of day and day of week information, carrier and hub preference information, and zone rates and unit haul rates information.

14. A method for scheduling manufacture of an item in a factory comprising:
planning a time for manufacturing an item so as to have the manufacture of the item complete during a desired shipping window;
determining the desired shipping window so as to allow the item to be shipped via a lower cost shipping method while arriving at a destination as if shipped via an expedited shipping method; and,
choosing from one of a plurality of carrier services for shipping the item so as to enable the item to be shipped via a lower cost shipping method while arriving at a destination as if shipped via an expedited shipping method.

15. The method of claim 14 wherein
the choosing from one of a plurality of carrier services includes ranking the plurality of carrier services based upon carrier service information.

16. The method of claim 15 wherein
the carrier service information includes at least one of carrier service shipping location information, line of business and order size information, shipment weight and maximum piece weight information, hub denied for destination information, service level information, shipping facility destination, zip code service level and total in transit information, time of day and day of week information, carrier and hub preference information, and zone rates and unit haul rates information.

17. The method of claim 14 wherein
the item is an information handling system.

18. A system for scheduling manufacture of an item in a factory comprising:
means for planning a time for manufacturing an item so as to have the manufacture of the item complete during a desired shipping window;
means for determining the desired shipping window so as to allow the item to be shipped via a lower cost shipping method while arriving at a destination as if shipped via an expedited shipping method; and,
means for determining a carrier service for shipping the item so as to enable the item to be shipped via a lower cost shipping method while arriving at a destination as if shipped via an expedited shipping method.

19. The system of claim 18 further comprising
means for obtaining a customer order, the customer order including the item ordered by a customer, the customer order including a desired shipping schedule, the desired shipping schedule corresponding to the expedited shipping method.

20. The system of claim 18 wherein
the item is an information handling system.

21. The system of claim 18 wherein
the means for determining a carrier service for shipping the item includes means for determining a size of the order.

22. The system of claim 19 wherein
the means for determining a carrier service for shipping the item includes means for determining a size of the customer order.

23. The system of claim 19 wherein
the order includes line of business information; and
the means for determining a carrier service for shipping the item includes means for analyzing the line of business information.

24. The system of claim 19 wherein
the carrier service includes corresponding time of day and day of week information; and,
the means for determining a carrier service for shipping the item includes means for analyzing the time of day and day of week information.

25. The system of claim 19 wherein
the carrier service includes corresponding hub information; and,
the means for determining a carrier service for shipping the item includes means for analyzing the hub information.

26. The system of claim 19 wherein
the carrier service includes corresponding service level information; and, the means for determining a carrier service for shipping the item includes means for analyzing the service level information.

27. The system of claim 19 wherein the carrier service includes corresponding shipping cost information; and, the means for determining a carrier service for shipping the item includes means for analyzing the shipping cost information.

28. The system of claim 19 wherein the carrier service includes corresponding preference information; and, the means for determining a carrier service for shipping the item includes means for analyzing the preference information.

29. The system of claim 19 wherein the carrier service includes a plurality of carrier service information; and, the means for determining a carrier service for shipping the item includes means for analyzing the plurality of carrier service information.

30. The system of claim 29 wherein the plurality of carrier service information includes at least two of carrier service shipping location information, line of business and order size information, shipment weight and maximum piece weight information, hub denied for destination information, service level information, shipping facility destination, zip code service level and total in transit information, time of day and day of week information, carrier and hub preference information, and zone rates and unit haul rates information.

31. A system for scheduling manufacture of an item in a factory comprising:
means for planning a time for manufacturing an item so as to have the manufacture of the item complete during a desired shipping window;
means for determining the desired shipping window so as to allow the item to be shipped via a lower cost shipping method while arriving at a destination as if shipped via an expedited shipping method; and,
means for choosing from one of a plurality of carrier services for shipping the item so as to enable the item to be shipped via a lower cost shipping method while arriving at a destination as if shipped via an expedited shipping method.

32. The system of claim 31 wherein the means for choosing from one of a plurality of carrier services includes means for ranking the plurality of carrier services based upon carrier service information.

33. The system of claim 32 wherein the carrier service information includes at least one of carrier service shipping location information, line of business and order size information, shipment weight and maximum piece weight information, hub denied for destination information, service level information, shipping facility destination, zip code service level and total in transit information, time of day and day of week information, carrier and hub preference information, and zone rates and unit haul rates information.

34. The system of claim 31 wherein the item is an information handling system.

35. An apparatus for scheduling manufacture of an item in a factory comprising:
a time planning module, the time planning module planning a time for manufacturing an item so as to have the manufacture of the item complete during a desired shipping window;
a shipping window module, the shipping window module determining the desired shipping window so as to allow the item to be shipped via a lower cost shipping method while arriving at a destination as if shipped via an expedited shipping method; and,
a carrier service determining module, the carrier service determining module determining a carrier service for shipping the item so as to enable the item to be shipped via a lower cost shipping method while arriving at a destination as if shipped via an expedited shipping method.

36. The apparatus of claim 35 further comprising an order obtaining module, the order obtaining module, obtaining a customer order, the customer order including the item ordered by a customer, the customer order including a desired shipping schedule, the desired shipping schedule corresponding to the expedited shipping method.

37. The apparatus of claim 35 wherein the item is an information handling system.

38. The apparatus of claim 35 wherein the carrier service determining module determines a size of the order.

39. The apparatus of claim 36 wherein the carrier service determining module determines a size of the customer order.

40. The apparatus of claim 36 wherein the order includes line of business information; and the carrier service determining module analyzes the line of business information.

41. The apparatus of claim 36 wherein the carrier service includes corresponding time of day and day of week information; and, the carrier service determining module analyzes the time of day and day of week information.

42. The apparatus of claim 36 wherein the carrier service includes corresponding hub information; and, the carrier service determining module analyzes the hub information.

43. The apparatus of claim 36 wherein the carrier service includes corresponding service level information; and, the carrier service determining module analyzes the service level information.

44. The apparatus of claim 36 wherein the carrier service includes corresponding shipping cost information; and, the carrier service determining module analyzes the shipping cost information.

45. The apparatus of claim 36 wherein the carrier service includes corresponding preference information; and, the carrier service determining module analyzes the preference information.

46. The apparatus of claim 36 wherein the carrier service includes a plurality of carrier service information; and, the carrier service determining module analyzes the plurality of carrier service information.

47. The apparatus of claim 46 wherein the plurality of carrier service information includes at least two of carrier service shipping location information, line of business and order size information, shipment weight and maximum piece weight information, hub denied for destination information, service level information, shipping facility destination, zip code service level and total in transit information, time of day and day of week information, carrier and hub preference information, and zone rates and unit haul rates information.

48. An apparatus for scheduling manufacture of an item in a factory comprising:

a time planning module, the time planning module planning a time for manufacturing an item so as to have the manufacture of the item complete during a desired shipping window;

a shipping window determining module, the shipping window determining module determining the desired shipping window so as to allow the item to be shipped via a lower cost shipping method while arriving at a destination as if shipped via an expedited shipping method; and, a carrier service choosing module, the carrier service choosing module choosing from one of a plurality of carrier services for shipping the item so as to enable the item to be shipped via a lower cost shipping method while arriving at a destination as if shipped via an expedited shipping method.

49. The apparatus of claim 48 wherein the carrier service choosing module ranks the plurality of carrier services based upon carrier service information.

50. The apparatus of claim 49 wherein the carrier service information includes at least one of carrier service shipping location information, line of business and order size information, shipment weight and maximum piece weight information, hub denied for destination information, service level information, shipping facility destination, zip code service level and total in transit information, time of day and day of week information, carrier and hub preference information, and zone rates and unit haul rates information.

51. The apparatus of claim 48 wherein the item is an information handling system.

* * * * *